(12) United States Patent
Pierce et al.

(10) Patent No.: US 9,626,647 B2
(45) Date of Patent: Apr. 18, 2017

(54) PROVIDING A CONTACT SERVICE

(75) Inventors: Darryl L. Pierce, Apex, NC (US);
Norman Lee Faus, Holly Springs, NC (US)

(73) Assignee: Red Hat, Inc., Raleigh, NC (US)

(*) Notice: Subject to any disclaimer, the term of this patent is extended or adjusted under 35 U.S.C. 154(b) by 1000 days.

(21) Appl. No.: 11/849,249

(22) Filed: Aug. 31, 2007

(65) Prior Publication Data
US 2009/0063635 A1 Mar. 5, 2009

(51) Int. Cl.
*G06F 15/173* (2006.01)
*G06Q 10/10* (2012.01)
*G06Q 50/00* (2012.01)
G06Q 30/02 (2012.01)
H04L 12/18 (2006.01)
H04L 29/06 (2006.01)
H04L 12/58 (2006.01)

(52) U.S. Cl.
CPC ............ *G06Q 10/10* (2013.01); *G06Q 50/01* (2013.01); *G06Q 30/0281* (2013.01); *H04L 12/1813* (2013.01); *H04L 51/20* (2013.01); *H04L 65/00* (2013.01)

(58) Field of Classification Search
CPC .............. H04L 12/581; H04L 12/1813; H04L 12/1822; H04L 12/2496; H04L 41/5093
See application file for complete search history.

(56) References Cited

U.S. PATENT DOCUMENTS

| | | | |
|---|---|---|---|
| 5,884,032 A | 3/1999 | Bateman et al. | |
| 6,321,192 B1 | 11/2001 | Houchin et al. | |
| 6,477,531 B1 | 11/2002 | Sullivan et al. | |
| 6,604,141 B1 | 8/2003 | Ventura | |
| 6,691,159 B1 | 2/2004 | Grewal et al. | |
| 6,829,585 B1* | 12/2004 | Grewal et al. | 705/8 |
| 6,934,381 B1* | 8/2005 | Klein | H04M 3/5233 379/265.09 |
| 7,216,121 B2 | 5/2007 | Bachman et al. | |
| 7,401,025 B1* | 7/2008 | Lokitz | 705/346 |
| 8,112,391 B2 | 2/2012 | Allen et al. | |
| 8,132,110 B1* | 3/2012 | Appelman et al. | 715/752 |
| 2003/0028441 A1 | 2/2003 | Barsness et al. | |
| 2003/0028525 A1* | 2/2003 | Santos et al. | 707/3 |
| 2003/0140037 A1* | 7/2003 | Deh-Lee | 707/3 |
| 2004/0012808 A1 | 1/2004 | Payne et al. | |
| 2004/0062381 A1* | 4/2004 | Shambaugh et al. | 379/265.02 |
| 2004/0083195 A1 | 4/2004 | McCord et al. | |
| 2004/0141508 A1 | 7/2004 | Schoeneberger et al. | |
| 2005/0027705 A1* | 2/2005 | Sadri et al. | 707/5 |
| 2006/0036685 A1* | 2/2006 | Canning et al. | 709/204 |
| 2006/0080130 A1 | 4/2006 | Choksi | |

(Continued)

OTHER PUBLICATIONS

USPTO; RH Office Action for U.S. Appl. No. 11/848,816 mailed May 27, 2009.

(Continued)

*Primary Examiner* — Tom Y Chang

(74) *Attorney, Agent, or Firm* — Lowenstein Sandler LLP

(57) ABSTRACT

An embodiment relates generally to a method of providing a service. The method includes receiving a request to determine a status of a user and determining an on-line status of the user. The method also includes providing a geographic proximity of the user in response to the on-line status of the user being on-line.

20 Claims, 7 Drawing Sheets

(56) References Cited

U.S. PATENT DOCUMENTS

| | | | |
|---|---|---|---|
| 2006/0178918 A1* | 8/2006 | Mikurak | 705/7 |
| 2007/0016584 A1* | 1/2007 | Grell | 707/9 |
| 2007/0095354 A1 | 5/2007 | Churchill et al. | |
| 2007/0255807 A1* | 11/2007 | Hayashi et al. | 709/219 |
| 2007/0255831 A1* | 11/2007 | Hayashi et al. | 709/226 |
| 2008/0034060 A1 | 2/2008 | Fisher, Jr. | |
| 2008/0132243 A1* | 6/2008 | Spalink | G09B 29/106 455/456.1 |
| 2008/0255759 A1* | 10/2008 | Abhyanker | 701/209 |
| 2009/0006523 A1* | 1/2009 | Kordun et al. | 709/202 |
| 2009/0063175 A1 | 3/2009 | Hibbets | |

OTHER PUBLICATIONS

USPTO; RH Advisory Action for U.S. Appl. No. 11/848,816 mailed Apr. 20, 2010.
USPTO; RH Office Action for U.S. Appl. No. 11/848,816 mailed Feb. 17, 2011.
USPTO; RH Office Action for U.S. Appl. No. 11/848,816 mailed Jul. 29, 2011.
USPTO; RH Office Action for U.S. Appl. No. 11/848,816 mailed Jul. 19, 2012.
USPTO; RH Office Action for U.S. Appl. No. 11/848,816 mailed Feb. 19, 2013.
USPTO; RH Advisory Action for U.S. Appl. No. 11/848,816 mailed Apr. 26, 2013.
USPTO; RH Office Action for U.S. Appl. No. 11/848,816 mailed Nov. 15, 2013.
U.S. Appl. No. 11/848,816, Final Office Action dated Mar. 2, 2010.

* cited by examiner

PROVIDING A CONTACT SERVICE

FIELD

This invention relates generally to computer services, more particularly, to systems and methods for providing a contact service.

DESCRIPTION OF THE RELATED ART

The businesses of the Fortune 500 spend large sums of money on their information technology (IT) infrastructure. The investment in IT can improve efficiency and productivity of a business in sales, accounting, financial support, research, etc.

Although these businesses often purchase large amounts of hardware and software, they also have the financial wherewithal to hire staff to maintain their IT infrastructure. The IT departments of these businesses can assist the users with software and user errors as well as tending to any broken hardware. The IT department can also plan for future improvements in the software and hardware. The IT department can also be responsible for training of the users in the IT system, which includes supported software applications and underlying hardware. Most importantly, the IT department can recover the IT infrastructure in the event of a catastrophic event.

Small businesses typically do not have the financial resources to afford an IT department. However, small businesses need the services that an IT department of a Fortune 500 company can provide: technical support in the event of a hardware and/or software failures, training of new employees in the existing system, integrate new technologies (software/hardware), etc.

Since small businesses cannot typically afford a full-time IT staff, a typical small business can hire consultants or go to a computer services company to implement and support their IT infrastructure. However, this is typically an unsatisfactory solution because the small business has to take the time to search for the consultants and/or services company and to verify their credentials. Moreover, the small business may not initially know where to look for the appropriate help and how to contact a person who can provide help.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
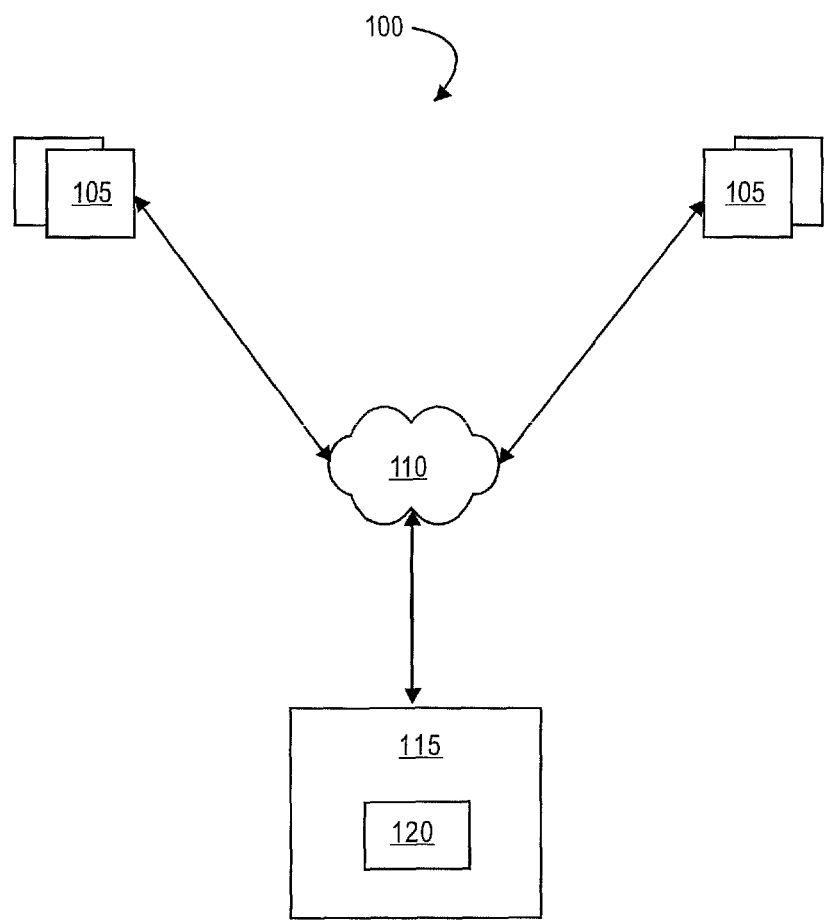
FIG. 1 depicts an exemplary system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of information portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments pertain generally to systems and methods for matchmaking between technical and business resources. More particularly, a contact service can be configured to provide introduction services for a user that is seeking assistance in a technical issue, i.e., a seeking user, with another user that can provide that technical support, i.e., a support user, on a service portal. The contact service can be configured to provide a presence detection of support users that are closest to the seeking user. The presence detection can be implemented in several ways.

In some embodiments, a support user can register as a technical expert in at least one field with the contact service. The seeking user can then search the contact service for support users in a specific field. The contact service can then return a list of support users by closest geographic proximity to the seeking user. Each entry on the list of support users can be configured to provide multiple ways (e.g., electronic mail, instant messaging, chat service, VoIP, etc.) to contact the respective support user. Each entry can also provide a rating of the support user.

In other embodiments, the contact service can also provide presence detection of users who provide answers in the forums of the service portal. The service portal can be configured to provide community forums for users to ask questions and post answers. The community forums can be organized around products, services or any topic of interest to a user community. A seeking user can search a forum for a particular issue. If the seeking user finds a post, the seeking user can use the contact service to determine whether the posting user is on-line and available to be contacted. More specifically, a user can right click (or an equivalent action such as a macro, keyboard combination, etc.) on the posting user to activate the contact service. The contact service can then determine the status of the posting user. If the posting user in on-line, the contact service can provide the seeking user electronic means to contact (e.g., electronic mail, IM, chat session, etc.) the posting user, determine a geographic proximity between the users, and a community rating of the posting user.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes users 105, a network 110 and a service portal 115. The users 105 can be private individuals, employees of private business or public entities or other persons interested in accessing the service portal 115. The users 105 can access the service portal 115 using personal computers, personal mobile devices, workstations or other networked computing platforms.

The network 110 can be a combination of wide area and local area networks such as the Internet. The network 110 can be configured to provide a communication channel between the users 105 and the service portal 115. The network 110 can implement a variety of network protocols to provide the communication channel such as Internet Protocol ("IP") Vx, ATM, SONET, or other similar network protocols.

The service portal 115 can be configured to provide products and services to the user 105 as well as provisioning, installation services, updates to software and hardware products and technical support. The service portal 115 can, among other functions, provide a list of products such as software applications and/or hardware devices as well as services such as installation, configuration, maintenance, etc., for users to purchase. As a non-limiting example, the service portal 115 can also provide information for users to research, compare and purchase software, hardware and consulting services in support of those software and/or hardware purchases. The service portal 115 can also be configured to provide support services by subscription to those same software, service, and/or hardware purchases.

In accordance with several embodiments, the service portal 115 can also provide a contact service 120 as one of the services. The contact service 120 can be configured to provide introduction services for a user that is seeking assistance in a technical issue, i.e., a seeking user, with another user that can provide that technical support, i.e., a support user, on the service portal 115 perhaps as an alternative to contacting a help desk of the service portal 115.

The contact service 120 can be configured to provide a presence detection of support users that are closest to the seeking user. The presence detection can be implemented in several ways. In some embodiments, a support user can register as a technical expert in at least one field with the contact service 120. The seeking user can then search the contact service 120 for support users in a specific field. The contact service 120 can then return a list of support users ordered by closest geographic proximity to the seeking user. Each entry on the list of support users can be configured to provide multiple mechanisms (e.g., electronic mail, instant messaging, chat service, VoIP, etc.) to contact the respective support user. Each entry can also provide a rating of the support user.

In other embodiments, the contact service can also provide presence detection of users who provide posts in forums of the service portal 115. The service portal 115 can be configured to provide a knowledge library that includes community forums for users to ask questions and post answers. The community forums can be organized around products, services or any thing of interest to a user community. A seeking user can search a forum for a particular issue. If the seeking user finds a post particularly interesting, the seeking user can use the contact service 120 find the posting user. The contact service 120 can determine whether the posting user is on-line and available to be contacted. More specifically, a user can maneuver the cursor over a posting user on a post and "right click" (or an equivalent action such as macro, keyboard combination, a menu option, etc.) to activate the contact service 120. The contact service 120 can then determine the status of the posting user and geographic proximity between the requesting user and posting user. If the posting user in on-line, the contact service can provide the seeking user a list of connection options to contact the posting user, the geographic proximity between the users, and a community rating of the posting user.

Figure 2:
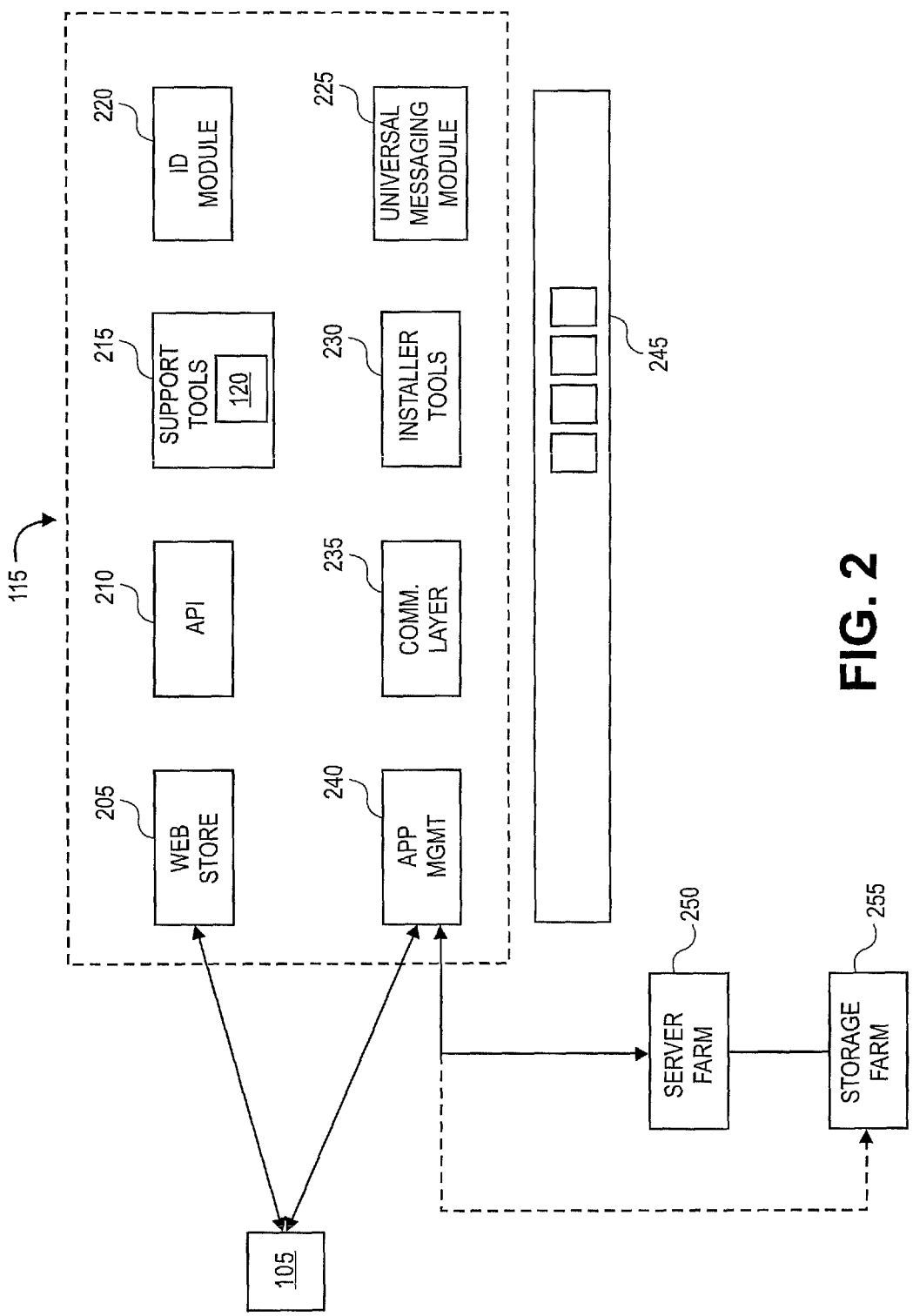
FIG. 2 illustrates an exemplary service portal of the system shown in FIG. 1 in accordance with another embodiment.

FIG. 2 illustrates a more detailed block diagram of the service portal 115 in accordance with another embodiment. It should be readily apparent to those of ordinary skill in the art that the service portal 115 depicted in FIG. 2 represents a generalized schematic illustration and that other components may be added or existing components may be removed or modified.

As shown in FIG. 2, the service portal 115 can include a web store module 205 that a user can interface with the service portal. The web store module 205 can provide the graphical user interfaces ("GUIs") and associated functions and/or services for the service portal 115. As a non-limiting example, the web store module 205 can generate a log-in GUI for a user to authenticate and enter the service portal 115.

The web store module 205 can couple with an application program interface ("API") module 210. The API module 210 can be configured to provide an interface between the functions and/or services provided by the web store module 205 and to the appropriate module of the service portal 115. More particularly, the API module 210 can call or direct a requested function or service from the user to the respective module that provides that requested function or service. For example, a user may request a price of a product, e.g., an electronic mail program, the API module 210 can direct the request to a get price function in a support tools module 215.

The API module 210 can also be configured to interface with the support tools module 215. The support tools module 215 can be configured to provide the supporting software and hardware to implement the functionality of the service portal 115. The support tools module 215 can contain and provide access to databases that contain information such as products lines, services providers, on-line self-help (e.g., knowledgebase), etc. The support tools module 215 can also provide services like instant messaging sessions, chat services, a help desk, installation, provisioning, etc.

The API module 210 can be further configured to couple with an identification ("ID") module 220. The ID module 220 can be configured to provide identification management services for the service portal 115. The ID module 220 can also store information related to users such as purchase history, user profile, usage history of the user, and entitlement data. An exemplary user profile is shown in FIG. 3.

Figure 3:
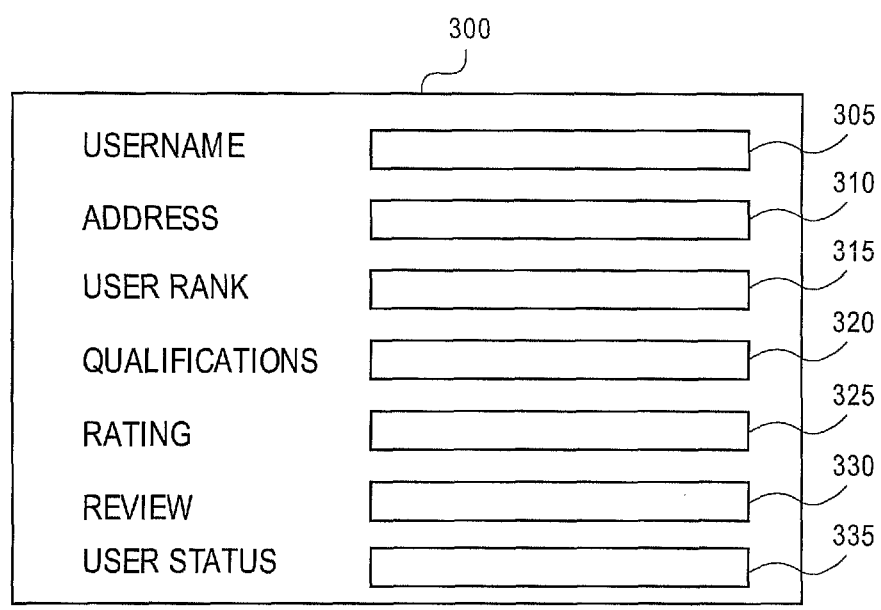
FIG. 3 depicts an exemplary user profile accordance with yet another embodiment.

FIG. 3 illustrates an exemplary user profile 300 in accordance with yet another embodiment. It should be readily apparent to those of ordinary skill in the art that the user profile depicted in FIG. 3 represents a generalized illustration and that other fields may be added or existing fields may be removed or modified.

As shown in FIG. 3, the user profile 300 can comprise of a username field 305, an address field 310, a user rank field 315, a qualification field 320, a rating field 325, a review field 330, and a user status field 335. The username field 305 can indicate the name that the user has selected to be known as in the system 115. Optionally, the user profile 300 can contain fields for the legal name of the user. The address field 310 can represent the street address of the user. The user rank field 315 can represent a category of user such as ordinary user, technical support, technical expert, employee, vendor, etc., for the service portal 115.

The qualification field 320 can represent a technical resume of the user. For example, this field 320 can comprise of a description of the user's experience in Unix or Java programming, certifications, or years of consulting for various information technology companies.

The rating field 325 can represent a rating of the user given by the user community. In some embodiments of the service portal 115, users can be given a rating based on their participation in the service portal 115. For example, the user may participate in several forums, posting answers or blogging. As a result of the participation, the other users can evaluate the postings/participation and place this rating in this field 325.

The review field 330 can represent a commentary of the user given by the user community. Similar to the rating field 325, the users of the user community may provide commentary of the user such as authenticating the user's qualification based on the user's participation/postings within the service portal 115.

The user status field 335 can represent an availability of the user. More particularly, if the user is busy assisting another user or logged-out, the user status field 335 can be set to indicate that this user is unavailable. If the user is available and/or logged-in, the user status field 335 can be cleared to indicate availability.

Returning to FIG. 2, the API module 210 can be further configured to couple with a universal messaging module 225. The universal messaging module 225 can be configured to provide a messaging application that unifies messages. More specifically, electronic mail ("email"), documents, and instant messaging can be linked in a single application. The universal messaging module 225 can also provide a mechanism for a user to view all the related documents for the user from email to Wiki pages.

An installer tools 230 can be coupled to the API module 210. One of the services provided by the service portal 115 can be the purchase of software applications provided by independent software vendors ("ISVs"). As part of the delivery of the software applications, the ISV can be required to maintain and update the installation tools to install their respective software applications. Accordingly, the installer tools 230 can be a repository where independent software vendors can deposit their respective installation tools.

The API module 210 can be further coupled to the communication layer 235 (labeled as COMM layer in FIG. 2). The communication layer 235 can be configured to provide the underlying services for the modules of the service portal 115 to communicate. For example, the communication layer 235 can contain middleware for a product database to communicate with a graphical user interface requesting product description.

The API module 210 can be further coupled to an application management module 240 (labeled as APP MGMT in FIG. 2). The application management module 240 can be configured to manage applications as requested by users. More specifically, a user may purchase a prepackaged software application pack (e.g., an operating system, electronic mail program and data mining program) from the service portal 115, which is stored in an application stack module 245. The application management module 240 can then deliver the purchased software stack, install, and configure the software application stack at a third party site such as server farm 250 or store the software application stack in a storage farm 255 for the user to retrieve.

The server farm 250 can be configured to provide computing platforms for users to lease. Accordingly, users can have a backup version of their systems, a testing platform to perform quality assurance tests on new applications, execute a program requiring excess MIPS, or any other similar computing task.

The storage farm 255 can be configured to provide storage space for users to lease. Accordingly, users can lease disk storage space to back up data, provide a hot data swap, or other storage intensive tasks.

In some embodiments, the contact service 120 can be configured to be executed in the support tools module 215. In other embodiments, the contact service 120 can be a module of the ID module 220. In yet other embodiments, the contact service 120 can be executed as a standalone module.

Figure 4:
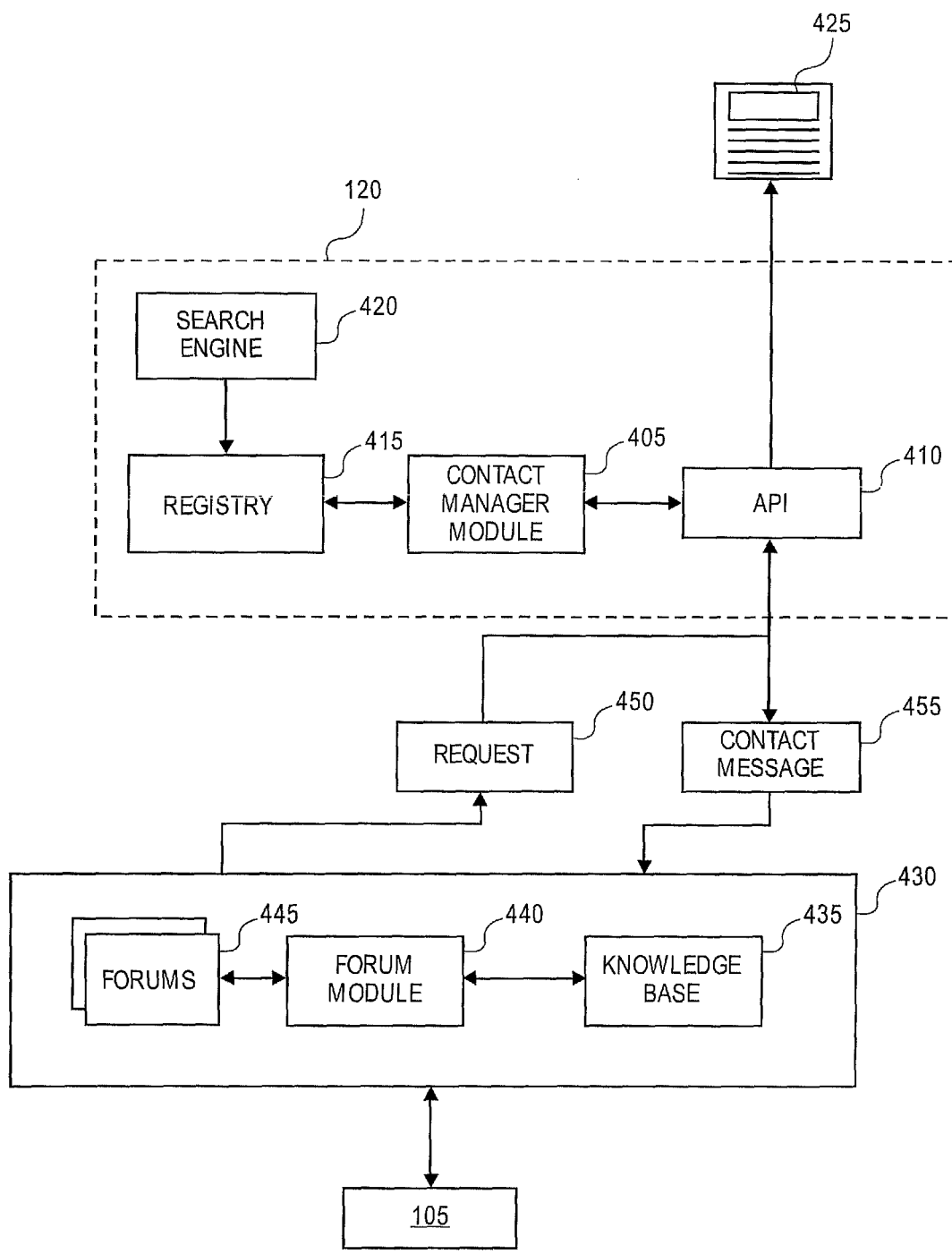
FIG. 4 illustrates a detailed block diagram of the contact service shown in FIG. 1 in accordance with yet another embodiment.

FIG. 4 illustrates a more detailed block diagram of the contact service 120 in accordance with another embodiment. It should be readily apparent to those of ordinary skill in the art that the contact service 120 depicted in FIG. 4 represents a generalized schematic illustration and that other components may be added or existing components may be removed or modified.

As shown in FIG. 4, the contact service 120 can comprise at least a contact manger module 405, an application program interface (labeled as "API" in FIG. 4) 410, a registry 415, and a search engine 420. It should be readily obvious to one of ordinary skill in the art that the modules 405-420 can be implemented as software applications (programmed in C, C++, JAVA, PHP, etc.), hardware components (EEPROM, application specific integrated circuit, microprocessor, etc.) or combinations thereof.

The contact manager module 405 can be configured to manage and to interface with the other modules 410-420 to provide the functionality of the contact service 120 as described above and further described herein below.

The API 410 can be configured to generate graphical user interfaces ("GUIs", e.g., web pages) as required by the contact manager module 405. For example, the API 410 can generate a search result page 425 that displays a list of support users ordered by geographic proximity to a requesting user. The API 410 can also be configured to receive requests from users to detect the presence of a selected users as well as to return the responses to the requests. In some embodiments, the API 410 can be considered an application program interface module which provides the necessary tools and interfaces to communicate with other modules of the contact service 120 and the other modules of the service portal 115.

The contact manager module 405 can also be coupled with the registry 415. The registry 415 can store the users of the user community of the service portal 115 that desire to be recognized as a technical expert in a selected technical field and are willing to assist other users, i.e., a technical support user. The registry 415 can store the username of the registering technical support user. The contact manager module 405 can then request additional information regarding a support user in the registry 415 from the associated user profile 300 stored in the ID module 220. The registry 415 can be implemented using a database as known to those skilled in the art.

The registry 415 can be coupled to the search engine 420. The search engine 420 can be configured to allow users to search for support users in the registry 415 in a selected technical area. The search engine 420 can be configured to return the search results from a received query to the contact manager module 405 for further processing. More particularly, the contact manager module 405 can be configured to determine the geographic location of the requesting user. For each entry on the search result, the contact manager module 410 can determine the geographic location of each listed support user. In some embodiments, the contact manager module 405 can convert the street address of a user to latitude/longitude ("lat/long") coordinates. From the lat/long coordinates, the contact manager module 405 can determine the distance between the requesting user to each listed support user. The contact manager module 405 can then re-order the search results based on closest proximity to the requesting user as a ordered search result page.

The contact manager module 405 can also provide a list of connection options for each entry on the ordered search result. More particularly, each entry on the ordered search result can be an active link. The requesting user can "right-click" with a cursor over a selected entry on the ordered search result and display a GUI widget, i.e., a dialog box which provides, among other things, connection options to contact the selected support user as depicted in FIG. 5.

Figure 5:
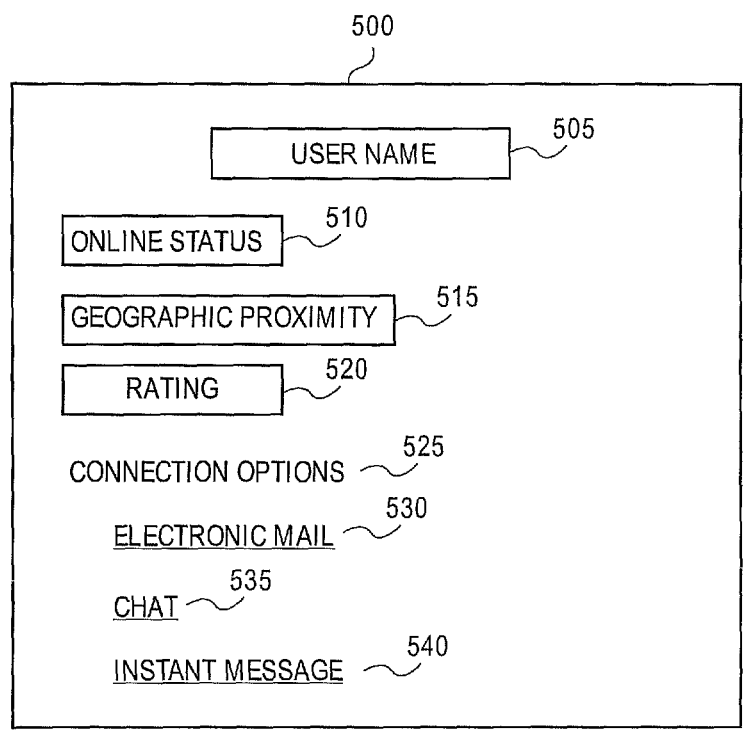
FIG. 5 depicts an exemplary connection option graphical user interface in accordance with yet another embodiment.

FIG. 5 shows an exemplary connection option GUI 500 in accordance with yet another embodiment. It should be readily apparent to those of ordinary skill in the art that the connection option GUI 500 depicted in FIG. 5 represents a generalized schematic illustration and that other components may be added or existing components may be removed or modified. Moreover, the connection option GUI 500 can be implemented using languages such as VisualBasic, Visual C++, Extensible Markup Language, PHP, Java, or other similar languages.

As shown in FIG. 5, the connection option GUI 500 can include a username field 505, a status field 510, a geographic proximity field 515, a rating field 520, and a connection list 525. The username field 505 can be configured to display the legal name of the selected user, which can be obtained from associated user profile 300 of the selected user.

The status field 510 can indicate whether the selected user is logged in or out as well as whether the selected user is busy. The geographic proximity field 515 can indicate the geographic proximity of the selected user is to the requesting user. In some embodiments, the unit of measure can be in miles. The rating field 520 can display the current rating of the user from the associated user profile of the selected user.

The connection list 525 can comprise a electronic mail link 530, a chat link 535, and an instant message link 540. When a user activates the electronic mail link 530, an electronic mail message can be instantiated with the selected user as the addressee. When a user activates the chat link 535, a chat session can be instantiated with the selected support user. Finally, when a user activates the instant message link 540, an instant message session can be instantiated to the selected support user. The chat and instant messaging services can be provided by the support tools module 215. In some embodiments, if the selected user is offline, the chat link 535 and instant message link 540 can be de-activated, i.e., grayed out, to indicate that the selected user can be contacted by electronic mail at current point.

Returning to FIG. 4, the search engine 420 is depicted as a separate module. However, the functions of the search engine 420 can be incorporated into contact manager module 405 or the registry 415 without departing from the scope and spirit of the embodiments of the present invention.

In accordance with various embodiments, the API module 410 can also interface with a knowledge library 430 of the service portal 115. The knowledge library 430 can be configured to provide a self-help library for users of the service portal 115. The knowledge library 430 can comprise a knowledgebase 435 which can contain Wiki-style articles regarding products, known issues, and solutions. The knowledgebase 435 can also contain frequently asked questions.

The knowledge library 430 can further comprise a forum module 440 to manage and monitor the forums 445. A forum can be regarded as essentially a website composed of a number of member-written threads. Each thread entails a discussion or conversation in the form of a series of user-member written posts. These threads remain saved on the forum website for future reading indefinitely or until deletion by a moderator.

Software packages that implement forum websites are generally well known. These software packages are widely available on the Internet in a variety of programming languages such as Hypertext Preprocess ("PHP"), Perl, Java, and active server pages ("ASP"). The configuration and records of posts can be stored in text files or in a database.

Accordingly, the forums 445 can be formed by their respective user communities around a selected topic. The topics can involve a product or service provided by the service portal 115. The user community can then post their issues in these forums 445 and attempt to get resolution from the user community. The forums 445 provide an alternative method of receiving technical assistance as well as discussing the pros and cons of a selected product or service.

In accordance with some embodiments, a user 105 can search a selected forum 445 for a selected issue. If the user 105 comes across a post of interest, the contact service 120 can provide a mechanism to contact the posting user as depicted in FIG. 6.

Figure 6:
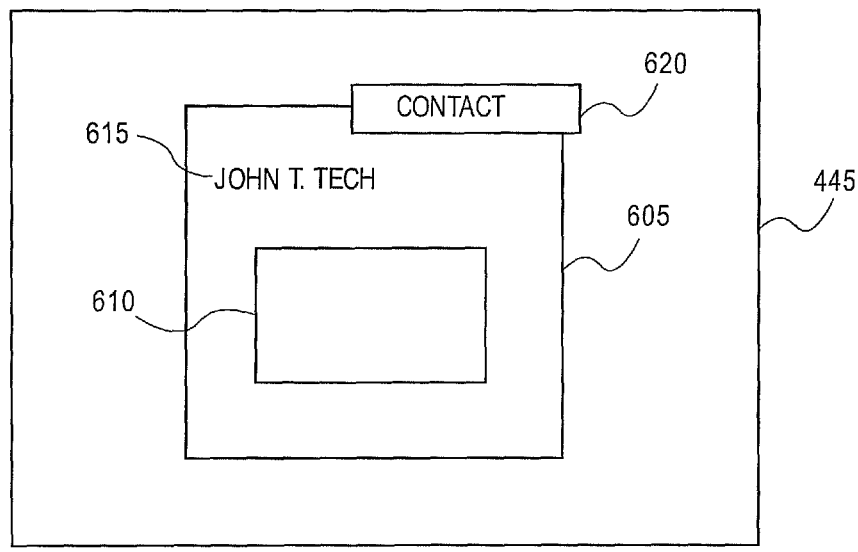
FIG. 6 illustrates an exemplary post in accordance with yet another embodiment.

As shown in FIG. 6, the user 105 can view a post 605 in a forum 445. The post 605 can include a text field 610, which includes the body of the post along with any previous posts on the same topic. The post 605 can include a posting user field 615. The user 105 can maneuver the cursor over the posting user field 615 and "right-click" or an equivalent action on the posting user field 615 to generate a contact request widget 620. The user 105 can activate the contact request widget 620 to generate a request to determine the location and status of the posting user to the contact manager module 405.

Returning to FIG. 4, when the user 105 "right-clicks" on the posting user field 615, a request 450 to determine the location and status of the posting user is generated. The request 450 is received by the contact manager module 405 through the API 410. The contact manager module 405 can then determine the lat/long coordinate of the requesting user and the posting user from their respective user profiles. The contact manager module 405 can also determine the on-line status of the posting user. Subsequently, the contact manager module 405 can respond with a contact message 455 that includes the connection option GUI 500 as described previously filled with the respective information from the user profile 300 of the posting user. Accordingly, the user 105 can then be provided with the status of the posting user and geographic proximity as well as connection options to contact the posting user.

Figure 7:
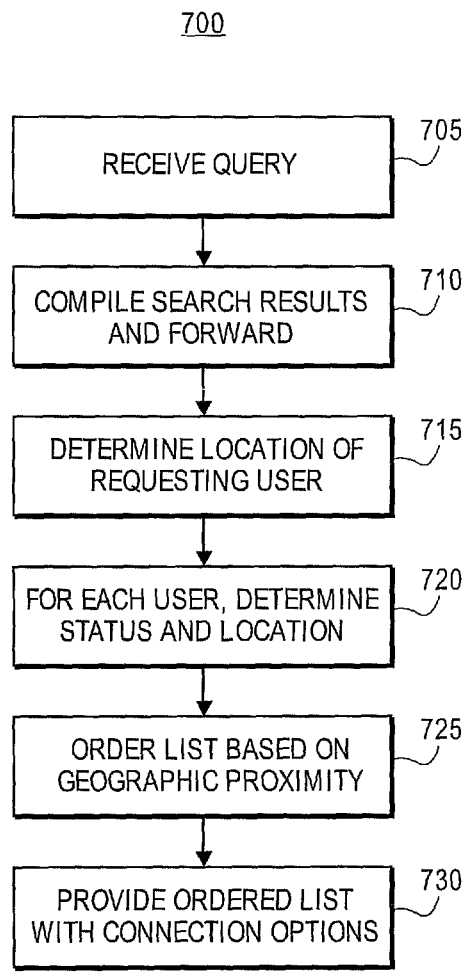
FIG. 7 depicts an exemplary flow diagram implemented by contact manager module in accordance with yet another embodiment.

FIG. 7 illustrates an exemplary search results flow diagram 700 in accordance with yet another embodiment. It should be readily apparent to those of ordinary skill in the art that the flow diagram 700 depicted in FIG. 7 represents a generalized schematic illustration and that other steps may be added or existing steps may be removed or modified.

As shown in FIG. 7, the search engine 420 can be configured to receive a query for support users in a technical field, in step 705. The search engine 420 can then search the registry 415 and compile any matching support users in a search result list, in step 710. The completed list is then forwarded to the contact manager module 405, which is then temporarily buffered.

In step 715, the contact manager module 405 can be configured to retrieve the street address of the requesting user from the associated user profile 300 of the requesting user and convert the address to lat/long coordinates. More specifically, in some embodiments, the contact manager module 405 can use a geographic services such as Map-Quest™ or Navteq™ to convert a street address to lat/long coordinates. The contact manager module 405 can temporarily buffer the lat/long coordinates of the requesting user.

In step 720, the contact manager module 405 can be configured to determine the status and location, i.e., lat/long coordinates, of each support user listed in the received search results list based on the associated user profiles 300 of each listed support user. The contact manager module 405 can then determine the geographic proximity, i.e., distance, between the requesting user and each user, which is then buffered temporarily.

In step 725, the contact manager module 405 can reorder the search results list based on closest geographic proximity as an ordered search result. In step 725, the contact manager module 405 can provide the ordered search result with each entry linked with a respective connection option GUI 500.

Figure 8:
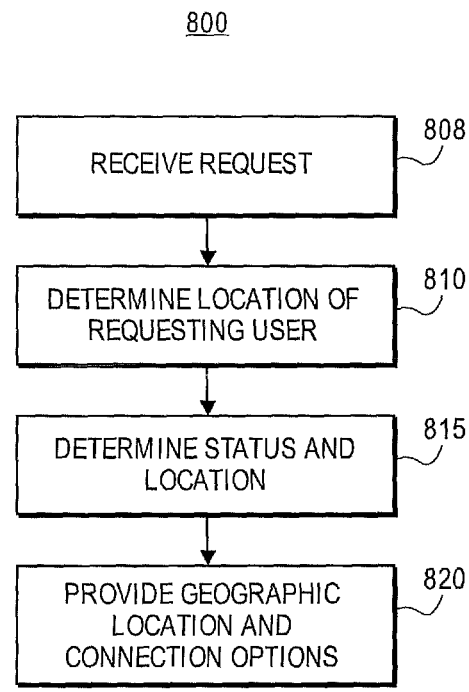
FIG. 8 illustrates another exemplary flow diagram implemented by the contact manager module in accordance with yet another embodiment.

FIG. 8 illustrates an exemplary request flow diagram 800 in accordance with yet another embodiment. It should be readily apparent to those of ordinary skill in the art that the flow diagram 800 depicted in FIG. 8 represents a generalized schematic illustration and that other steps may be added or existing steps may be removed or modified.

As shown in FIG. 8, the contact manager module 405 can be configured to receive a request 450 from a requesting user viewing a post in a forum 445, in step 805. In step 810, the contact manager module 405 can be configured to retrieve the street address of the requesting user from the associated user profile 300 of the requesting user and convert the address to lat/long coordinates. The contact manager module 405 can temporarily buffer the lat/long coordinates of the requesting user.

In step 815, the contact manager module 405 can be configured to determine the status and location, i.e., lat/long coordinates, of the posting user. The contact manager module 405 can then determine the geographic proximity, i.e., distance, between the requesting user and the posting user.

In step 820, the contact manager module 405 can generate a connection option GUI 500 with the posting user information based on the user profile of the posting user and forward the GUI to the requesting user as the contact message 455.

Figure 9:
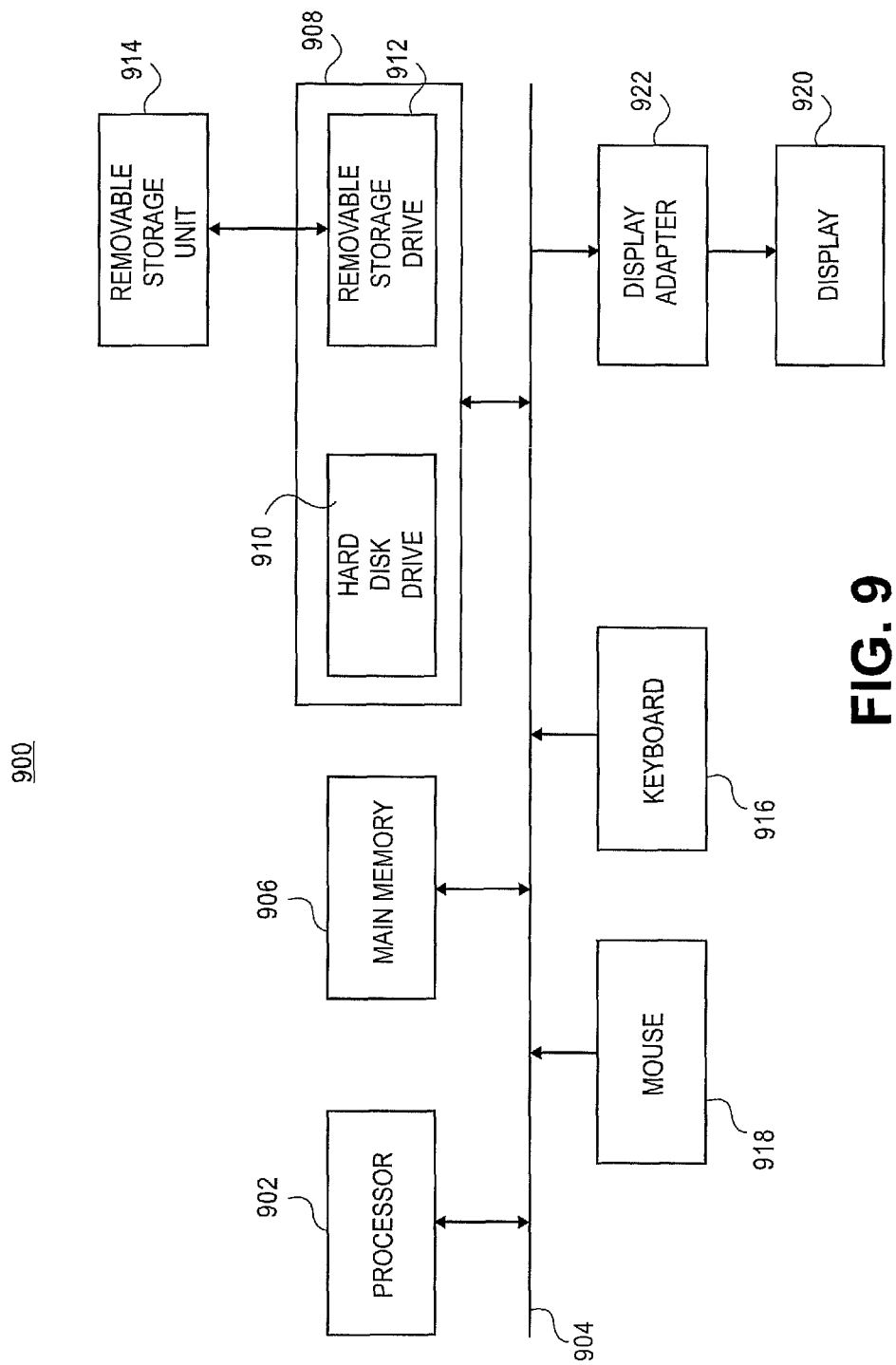
FIG. 9 depicts an exemplary computer system in accordance with yet another embodiment.

FIG. 9 illustrates an exemplary block diagram of a computing platform 900 where an embodiment may be practiced. The functions of the contact service 120 may be implemented in program code and executed by the computing platform 900. The contact service 120 may be implemented in computer languages such as PASCAL, C, C++, JAVA, etc.

As shown in FIG. 9, the computer system 900 includes one or more processors, such as processor 902 that provide an execution platform for embodiments of the contact service 120. Commands and data from the processor 902 are communicated over a communication bus 904. The computer system 900 also includes a main memory 906, such as a Random Access Memory (RAM), where the contact service 120 may be executed during runtime, and a secondary memory 908. The secondary memory 908 includes, for example, a hard disk drive 910 and/or a removable storage drive 912, representing a floppy diskette drive, a magnetic tape drive, a compact disk drive, etc., where a copy of a computer program embodiment for the contact service 120 may be stored. The removable storage drive 912 reads from and/or writes to a removable storage unit 914 in a well-known manner. A user interfaces with the contact service 120 with a keyboard 916, a mouse 918, and a display 920. The display adapter 922 interfaces with the communication bus 904 and the display 920. A display adapter 922 also receives display data from the processor 902 and converts the display data into display commands for the display 920.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   providing, by a processor, to a requesting user device, a web-based contact service comprising a forum to search for posts associated with a technical issue;
   receiving a selection of a post associated with the technical issue from the requesting user device;
   receiving a selection indicating a posting user of the post associated with the technical issue from the requesting user device;
   determining, by the processor, in response to the selection indicating the posting user of the post associated with the technical issue, a status of the posting user, wherein the status of the posting user is in view of whether the posting user is currently logged in to the contact service, and wherein the status of the posting user is further in view of whether the posting user is current assisting another user;

determining, by the processor, in response to the selection of the posting user of the post associated with the technical issue and further in response to the status of the posting user being logged in to the contact service and not currently assisting another user, a geographic proximity of the posting user to the requesting user device; and providing in a graphical user interface, an indication of the status of the posting user, the geographic proximity of the posting user to the requesting user device, and a plurality of actionable links to contact the posting user.

2. The method of claim 1, wherein the plurality of actionable links comprises at least one of electronic mail, instant message or chat service.

3. The method of claim 2, further comprising providing, by the processor to the requesting user device, a list of connection options to contact the posting user.

4. The method of claim 3, further comprising deactivating at least one of the plurality of actionable links in view of the status of the posting user.

5. The method of claim 1, further comprising providing, by the processor to the requesting user device, an indication of a community rating of the posting user.

6. The method of claim 1, wherein the posting user is associated with a posting user profile and the posting user profile comprises at least one of a user name, a user address, user rank, a user qualification, a user rating, a user review or a user status field.

7. The method of claim 6, further comprising determining the user rating in view of evaluation provided by other posting users.

8. The method of claim 6, further comprising determining the user rating in view of amount of participation of the posting user in the forum.

9. The method of claim 6, further comprising determining the user review in view of commentary provided by other posting users, wherein the commentary comprises authentication of qualification of the posting user in view of participation of the posting user in the forum.

10. The method of claim 6, wherein the user rank comprises at least one of an ordinary user, a technical support, a technical expert, an employee or a vendor.

11. An apparatus comprising:
a memory; and
a processor operatively coupled with the memory, the processor to:
provide, to a requesting user device, a web-based contact service comprising a forum to search for posts associated with a technical issue;
receive a selection of a post associated with the technical issue from the requesting user device;
  receive a selection of a posting user of the post associated with the technical issue from the requesting user device;
  determine, in response to the selection indicating the posting user of the post associated with the technical issue, a status of the posting user, wherein the status of the posting user is in view of whether the posting user is currently logged in to the contact service, and wherein the status of the posting user is further in view of whether the posting user is current assisting another user;
  determine, in response to the selection of the posting user of the post associated with the technical issue and in further response to the status of the posting user being logged in to the contact service and not currently assisting another user, a geographic proximity of the posting user to the requesting user device; and
  provide in a graphical user interface, an indication of the status of the posting user, the geographic proximity of the posting user to the requesting user device, and a plurality of actionable links to contact the posting user.

12. The apparatus of claim 11, wherein the plurality of actionable links comprises at least one of electronic mail, instant message or chat service.

13. The apparatus of claim 12, wherein the processor is further to provide, to the requesting user device, a list of connection options to contact the posting user.

14. The apparatus of claim 13, wherein the processor is further to deactivate at least one of the plurality of actionable links in view of the status of the posting user.

15. The apparatus of claim 11, wherein the processor is further to provide, to the requesting user device, an indication of a community rating of the posting user.

16. A non-transitory computer readable storage medium comprising instructions stored thereon that, when executed by a processor, cause the processor to:
provide, by the processor to a requesting user device, a web-based contact service comprising a forum to search for posts associated with a technical issue;
receive a selection of a post associated with the technical issue from the requesting user device;
receive, by the processor, a selection indicating a posting user of the post associated with the technical issue from the requesting user device;
determine, by the processor in response to the selection indicating the posting user of the post associated with the technical issue, a status of the posting user, wherein the status of the posting user is in view of whether the posting user is currently logged in to the contact service, and wherein the status of the posting user is further in view of whether the posting user is current assisting another user;
determine, by the processor in response to the selection of the posting user of the post associated with the technical issue and further in response to the status of the posting user being logged in to the contact service and not currently assisting another user, a geographic proximity of the posting user to the requesting user device; and
provide in a graphical user interface, an indication of the status of the posting user, the geographic proximity of the posting user to the requesting user device, and a plurality of actionable links to contact the posting user.

17. The non-transitory computer readable storage medium of claim 16, wherein the plurality of actionable links comprises at least one of electronic mail, instant message or chat service.

18. The non-transitory computer readable storage medium of claim 17, the processor further to provide to the requesting user device, a list of connection options to contact the posting user.

19. The non-transitory computer readable storage medium of claim 18, the processor to further deactivate at least one of the plurality of actionable links in view of the status of the posting user.

20. The non-transitory computer readable storage medium of claim 16, the processor to further provide, by the processor to the requesting user device, an indication of a community rating of the posting user.

* * * * *